(12) United States Patent
Fawcett

(10) Patent No.: US 10,554,782 B2
(45) Date of Patent: *Feb. 4, 2020

(54) AGILE HOSTPOOL ALLOCATOR

(75) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 904 days.

This patent is subject to a terminal disclaimer.

(21) Appl. No.: 13/308,841

(22) Filed: Dec. 1, 2011

(65) Prior Publication Data

US 2013/0145031 A1   Jun. 6, 2013

(51) Int. Cl.
*H04L 29/08* (2006.01)
*G06F 9/48* (2006.01)

(52) U.S. Cl.
CPC ............ *H04L 67/32* (2013.01); *G06F 9/4881* (2013.01); *H04L 67/1012* (2013.01); *H04L 67/1023* (2013.01)

(58) Field of Classification Search
CPC ..... G06F 9/5066; G06F 9/4881; H04L 67/32; H04L 67/1012; H04L 67/1023
USPC ........................................................ 718/106
See application file for complete search history.

(56) References Cited

U.S. PATENT DOCUMENTS

| | | | |
|---|---|---|---|
| 6,097,886 A * | 8/2000 | Dave et al. | 703/23 |
| 6,393,473 B1 | 5/2002 | Chu | |
| 7,493,406 B2 | 2/2009 | Amini et al. | |
| 7,539,976 B1 | 5/2009 | Ousterhout et al. | |
| 7,613,848 B2 | 11/2009 | Amini et al. | |
| 7,657,855 B1 | 2/2010 | Manaker et al. | |
| 7,676,552 B2 | 3/2010 | Eilam et al. | |
| 7,676,788 B1 | 3/2010 | Ousterhout et al. | |
| 7,899,861 B2 | 3/2011 | Feblowitz et al. | |
| 8,225,319 B2 | 7/2012 | Laithwaite et al. | |
| 8,407,322 B1 * | 3/2013 | Sasikumar | G06F 9/5066 709/220 |
| 8,849,888 B2 | 9/2014 | Fawcett | |
| 8,868,963 B2 | 10/2014 | Fawcett | |
| 8,874,751 B2 | 10/2014 | Fawcett | |

(Continued)

FOREIGN PATENT DOCUMENTS

| | | |
|---|---|---|
| CN | 1744593 A | 3/2006 |
| EP | 0936547 A2 | 8/1999 |

OTHER PUBLICATIONS

Author unknown. "IBM InfoSphere Streams, Version 1.2.1: Programming Model and Language Reference" published by IBM. Updated Oct. 4, 2010. 206 pages. Available online: http://pic.dhe.ibm.com/infocenter/streams/v1r2/topic/com.ibm.swg.im.infosphere.streams.product.doc/doc/IBMInfoSphereStreams-LangRef.pdf.*

(Continued)

*Primary Examiner* — Aaron N Strange
(74) *Attorney, Agent, or Firm* — Patterson + Sheridan, LLP

(57) ABSTRACT

A stream application may use small chunks of executable code configured to process data tuples flowing into a processing element. A scheduler allocates the processing elements to individual compute nodes or hosts for execution. However, the stream application may assign various constraints that stipulate which hosts are suitable for a particular processing element. To assign hosts to processing elements such that the constraints are satisfied, the scheduler may use hostpools associated with the processing elements. Once a host is identified that satisfies the constraints, it may be pinned at a particular index within the hostpool.

20 Claims, 8 Drawing Sheets

(56) References Cited

U.S. PATENT DOCUMENTS

| | | | |
|---|---|---|---|
| 8,898,505 B2 | 11/2014 | Fawcett | |
| 2004/0039815 A1 | 2/2004 | Evans et al. | |
| 2005/0108714 A1 | 5/2005 | Geye et al. | |
| 2005/0177600 A1 | 8/2005 | Eilam et al. | |
| 2005/0198244 A1* | 9/2005 | Eilam et al. | 709/223 |
| 2007/0021998 A1 | 1/2007 | Laithwaite et al. | |
| 2007/0233881 A1* | 10/2007 | Nochta et al. | 709/228 |
| 2008/0127191 A1* | 5/2008 | Barsness et al. | 718/102 |
| 2008/0134193 A1 | 6/2008 | Corley et al. | |
| 2008/0174598 A1 | 7/2008 | Risenhoover | |
| 2008/0225326 A1 | 9/2008 | Kephart et al. | |
| 2009/0049443 A1* | 2/2009 | Powers | G06F 9/505 718/100 |
| 2009/0132541 A1* | 5/2009 | Barsness et al. | 707/10 |
| 2009/0183168 A1 | 7/2009 | Uchida | |
| 2009/0193427 A1* | 7/2009 | Pu | G06F 9/5072 718/104 |
| 2009/0239480 A1 | 9/2009 | Rofougaran et al. | |
| 2009/0241123 A1* | 9/2009 | Bansal et al. | 718/104 |
| 2009/0300326 A1 | 12/2009 | Sweeney | |
| 2009/0300615 A1* | 12/2009 | Andrade et al. | 718/100 |
| 2009/0300623 A1* | 12/2009 | Bansal et al. | 718/102 |
| 2009/0306615 A1 | 12/2009 | Olsson | |
| 2009/0313614 A1 | 12/2009 | Andrade et al. | |
| 2010/0292980 A1* | 11/2010 | Andrade et al. | 703/22 |
| 2010/0325621 A1 | 12/2010 | Andrade et al. | |
| 2011/0055519 A1 | 3/2011 | Schenfeld et al. | |
| 2011/0246549 A1* | 10/2011 | Katzenberger et al. | 709/201 |
| 2012/0096468 A1 | 4/2012 | Chakravorty et al. | |
| 2012/0110550 A1 | 5/2012 | Ghosh et al. | |
| 2012/0117244 A1 | 5/2012 | Melander et al. | |
| 2013/0144931 A1 | 6/2013 | Fawcett | |
| 2013/0145032 A1 | 6/2013 | Fawcett | |
| 2013/0145034 A1 | 6/2013 | Fawcett | |
| 2013/0145121 A1 | 6/2013 | Fawcett | |
| 2015/0286505 A1* | 10/2015 | Liu | G06F 9/5011 718/104 |

OTHER PUBLICATIONS

Joel Wolf, Nikhil Bansal, Kirsten Hildrum, Sujay Parekh, Deepak Rajan, Rohit Wagle, Kun-Lung Wu, and Lisa Fleischer. "SODA: An Optimizing Scheduler for Large-Scale Stream-Based Distributed Computer Systems." Proceedings of Middleware '08, Dec. 2008. Springer-Verlag New York, Inc., New York, NY, USA, pp. 306-325.*

Eric Bouillet, Mark Feblowitz, Zhen Liu, Anand Ranganathan, and Anton Riabov. "A Tag-Based Approach for the Design and Composition of Information Processing Applications". Published in "OOPSLA '08", Oct. 19-23, 2008. pp. 585-602.*

Michael Sindelar, Ramesh K. Sitaraman, and Prashant Shenoy. "Sharing-aware algorithms for virtual machine colocation" in "Proceedings of the twenty-third annual ACM symposium on Parallelism in algorithms and architectures". ACM: New York, NY. Jun. 4, 2011. pp. 367-378.*

Timothy Wood, Gabriel Tarasuk-Levin, Prashant Shenoy, Peter Desnoyers, Emmanuel Cecchet, et al. "Memory Buddies: Exploiting Page Sharing for Smart Colocation in Virtualized Data Centers" in "Proceedings of the 2009 ACM SIGPLAN/SIGOPS international conference on Virtual execution environments (VEE '09)". ACM: New York, NY. Mar. 11, 2009. pp. 31-40.*

Giovanni Aloisio, Massimo Cafaro, Euro Blasi, and (talo Epicoco. "The Grid Resource Broker, a ubiquitous grid computing framework." Scientific Programming. vol. 10 (2002), Issue 2, pp. 113-119.*

Ranieri Baraglia, Renato Ferrini, and Pierluigi Ritrovato. "A static mapping heuristics to map parallel applications to heterogeneous computing systems." Concurrency Computat.: Pract. Exper. 2005; 17:1579-1605. Jun. 24, 2005.*

Michael G. Norman and Peter Thanisch. "Models of Machines and Modules for Mapping to Minimise Makespan in Multicomputers." Technical Report 9114, University of Edinburgh, Edinburgh University Computing Centre, 1996. 42 pages.*

Mary Mehrnoosh Eshaghiany. "Mapping Arbitrary Heterogeneous Task Graphs onto Arbitrary Heterogeneous System Graphs." Int. J. Found. Comput. Sci., 12, 599 (2001). 30 pages.*

M. Anton Ertl and Andreas Krall. "Optimal Instruction Scheduling using Constraint Logic Programming." In: Programming Language Implementation and Logic Programming (PLILP): 1991. Springer LNCS 528, pp. 75-86.*

S.S. Skiena, The Algorithm Design Manual, 2nd ed., DOI: 10.1007/978-1-84800-070-4_14, Springer-Verlag London Limited 2008. pp. 468-471.*

Harry Printz, H. T. Kung, Todd Mummert, and Paul Scherer. "Automatic Mapping of Large Signal Processing Systems to a Parallel Machine." Realtime Signal Processing XII: SPIE vol. 1154, 1989. pp. 2-16.*

Madden, Samuel et al., Fjording the Stream: An Architecture for Queries over Streaming Sensor Data, Proceedings of the 18th International Conference on Data Engineering, 2002, p. 555, IEEE, Piscataway, New Jersey, United States.

Liew, C.S. et al., Towards Optimising Distributed Data Streaming Graphs using Parallel Streams, Proceedings of the 19th ACM International Symposium on High Performance Distributed Computing, 2010, pp. 725-736, ACM, New York, New York, United States.

Lakshmanan, Geetika T. et al., Biologically-Inspired Distributed Middleware Management for Stream Processing Systems, Proceedings of the 9th ACM/IFIP/USENIX International Conference on Middleware, 2008, pp. 223-242, Springer-Verlag New York, Inc., New York, New York, United States.

IBM, IBM InfoSphere Streams V2.0 extends streaming analytics, simplifies development of streaming application, and improves performance, Apr. 12, 2011, pp. 1-17, IBM Corporation, Armonk, New York, United States.

Bouillet, Eric et al., Scalable, Real-time Map-Matching using IBM's System S, Proceedings of the 2010 Eleventh International Conference on Mobile Data Management, 2010, pp. 249-257, IEEE Computer Society, Washington, DC, United States.

Le, Jia-Jin et al., DDSQP: A WSRF-Based Distributed Data Stream Query System, Lecture Notes in Computer Science, 2005, pp. 833-844, vol. 3758, Springer, New York, New York, United States.

Ahmad, Yanif et al., Network Awareness in Internet-Scale Stream Processing, IEEE Data Engineering Bulletin, Mar. 2005, pp. 63-69, vol. 28, No. 1, IEEE, Piscataway, New Jersey, United States.

Zhang, Xiaolan J. et al, Workload Characterization for Operator-Based Distributed Stream Processing Applications, Proceedings of the Fourth ACM International Conference on Distributed Event-Based Systems, 2010, pp. 235-247, ACM, New York, New York, United States.

Bugra Gedik et al., "SPADE: The System S Declarative Stream Processing Engine", ACM, SIGMOD '08, Jun. 9-12, 2008, Vancouver, BC, Canada, sections 2, 4.1, 5.3, pp. 1123-1134.

Kun-Lung Wu et al., "Challenges and Experience in Prototyping a Multi-Modal Stream Analytic and Monitoring Application on System S", VLDB '07, Sep. 23-28, 2007, Vienna, Austria, pp. 1185-1196.

International Search Report and Written Opinion of the ISA dated Apr. 25, 2013—International Application No. PCT/182012/056823, 8 pages.

International Search Report and Written Opinion of the ISA dated Apr. 25, 2013—International Application No. PCT/IB2012/056818, 8 pages.

Lakshmanan, G. T. et al., Placement Strategies for Internet-Scale Data Stream Systems, Nov. 11, 2008, pp. 50-60, vol. 12, Issue 6, IEEE Computer Society, Washington, DC, United States (abstract only).

Gedik, Bugra, High-performance Event Stream Processing Infrastructures and Applications with System S, IBM Research, 2009, IBM Corporation, Armonk, New York, United States, 37 pages.

Amini, Lisa et al., Adaptive Control of Extreme-scale Stream Processing Systems [Abstract], Proceedings of the 26th IEEE

(56) References Cited

OTHER PUBLICATIONS

International Conference on Distributed Computing Systems (ICDCS'06), 2006, IEEE Computer Society, Washington, DC, United States, 7 pages.
Guha, Radha et al., An Efficient Placement Algorithm for Run-time Reconfigurable Embedded System, Proceedings of the 19th IASTED International Conference on Parallel and Distributed Computing and Systems, 2007, ACTA Press, Anaheim, California, United States, 7 pages.

* cited by examiner

420

| ALLOCATION WITHOUT CONSIDERING CONSTRAINTS ||
| HOSTPOOL | PINNED HOSTS |
| --- | --- |
| HOSTPOOL 1 | HOSTS A and B |
| HOSTPOOL 2 | HOSTS C, D, and E |
| HOSTPOOL 3 | HOST D |

425

| PE | ASSOCIATED HOSTPOOL | CONSTRAINT |
| --- | --- | --- |
| PE1 | HOSTPOOL 1 | CO-LOCATE GROUP1 |
| PE2 | HOSTPOOL 2 | CO-LOCATE GROUP1; EX-LOCATE GROUP 1 |
| PE3 | HOSTPOOL 3 | EX-LOCATE GROUP1 |
| PE4 | HOSTPOOL 2 | EX-LOCATE GROUP1 |
| PE5 | HOSTPOOL 2 | EX-LOCATE GROUP1 |

430

| ALLOCATION WITH CONSTRAINTS |||
| HOSTPOOL | PINNED HOSTS | PE ALLOCATION |
| --- | --- | --- |
| HOSTPOOL 1 | HOSTS A and C | PE1→HOST C; |
| HOSTPOOL 2 | HOSTS C, E, and F | PE2→HOST C; PE4→HOST E; PE5→HOST F |
| HOSTPOOL 3 | HOST D | PE3→HOST D |

FIG. 4B

AGILE HOSTPOOL ALLOCATOR

BACKGROUND

Field of the Invention

Embodiments of the present invention generally relate to stream applications. Specifically, the invention relates to assigning or pinning a compute node to a hostpool when establishing a stream application.

Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the present invention generally relate to stream applications. Specifically, the invention relates to assigning or pinning a compute node to a hostpool when establishing a stream application.

Embodiments of the present invention include a computer-implemented method, system, and computer readable storage medium for allocating a processing element selected from a plurality of processing elements to a compute node. The method, system, and storage medium include determining eligible compute nodes that can be assigned to a hostpool associated with the processing element, where the hostpool defines a set of one or more compute nodes, and the compute nodes comprise one or more computer processors. The method, system, and storage medium also include selecting, based on constraints associated with the processing element, a suitable compute node from the eligible compute nodes. The method, system, and storage medium also include allocating the processing element to the suitable compute node and assigning the suitable compute node to the hostpool where the plurality of processing elements establish an operator graph of the plurality of processing elements. Further, the operator graph defines at least one execution path where at least one of the processing elements of the operator graph is configured to receive data from at least one upstream processing element and transmit data to at least one downstream processing element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 4A-4B illustrate tables detailing the assignment of hosts to hostpools, according to embodiments of the invention.

DETAILED DESCRIPTION

Figure 1A:
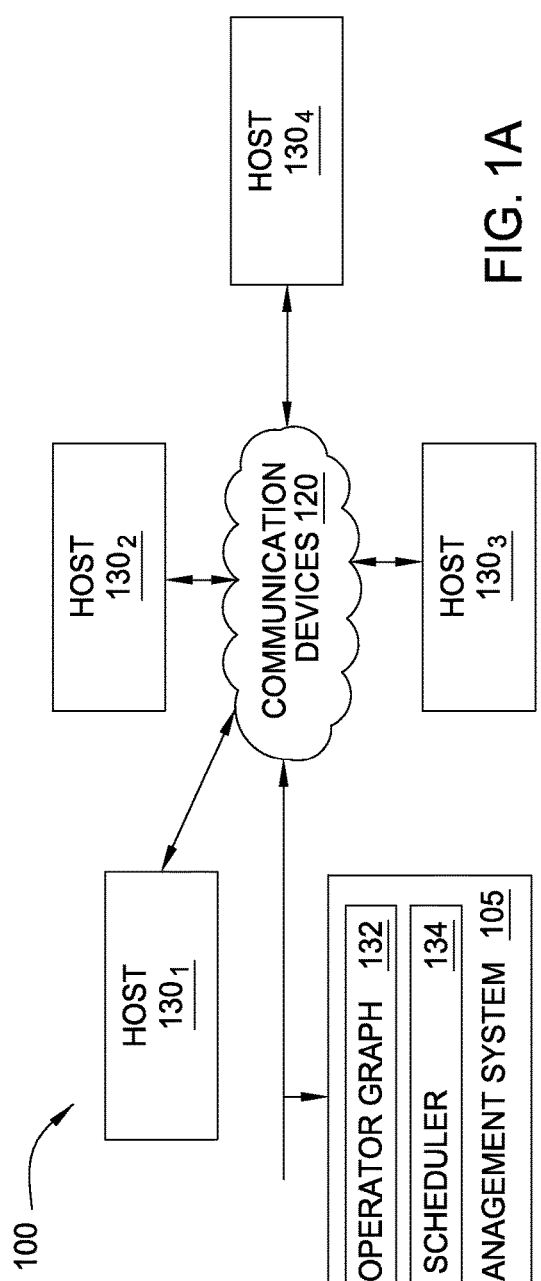
FIGS. 1A-1B illustrate a computing infrastructure configured to execute a stream application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one operator to the next forming a logical dataflow graph. Scalability is reached by distributing an application across compute nodes by creating many small executable pieces of code—i.e., processing elements (PE)—as well as load balancing among them. One or more operators in a stream application can be fused together to form a PE. Doing so allows the fused operators to share a common process space (i.e., shared memory), resulting in much faster communication between operators than is available using inter-nodal communication protocols (e.g., using a TCP/IP). Further, groups of processing elements—i.e., jobs—can be inserted or removed dynamically from one or more applications performing streaming data analysis.

One advantage of stream applications is that they allow the user to granularly control the process flow of data through the application. In other words, the user may designate specific operators for each PE that perform various operations on the incoming data, and may dynamically alter the stream application by modifying the operators and the order in which they are performed.

Additionally, a stream application may use a hostpool when assigning each PE to a compute node. Stated simply, the PE is a portion of the stream application that is assigned to execute on a particular host—i.e., a compute node with the necessary hardware to perform the software functions defined by the PE. The allocation of the PEs onto the available hosts determines the runtime characteristics of the stream application—e.g., performance, availability, etc.

PEs, operators, hostpools, jobs, and even hosts may have associated constraints that dictate the runtime characteristics of the stream; for example, whether the PE can be placed on a host that is also executing other PEs or whether two PEs must be placed on the same host. The first constraint may increase the availability of the stream application while the second may increase its performance.

A hostpool is generally a collection of hosts that have been assigned to PEs. The hostpool provides the stream application with flexibility when selecting a host for a PE. A stream application may fail if all the PEs cannot be assigned to a host while simultaneously meeting all of the associated constraints. Instead of a developer specifically assigning each PE to a specific host (a daunting task for stream applications that include thousands of PEs) the developer may tag or label a host based on a particular characteristic of the host (i.e., high-memory, multiple processor cores, etc.). The hostpools may be similarly tagged based on whether the PEs associated with the hostpool should be allocated to a particular type of host. If a hostpool and host share the same tag, the host is a candidate for the hostpool. The stream application may then evaluate each of the candidate hosts to determine if they meet the constraints assigned to a PE. If so, the host may be assigned or pinned to that hostpool. If the stream application is able to assign all the PEs of a stream application to a host in the hostpool then the stream application has successful been established.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the compute nodes or hosts used to create a stream application may be virtual or physical machines maintained by a cloud service provider. Doing so allows a user to send data to the stream application from any computing system attached to a network connected to the cloud (e.g., the Internet).

Figure 1B:
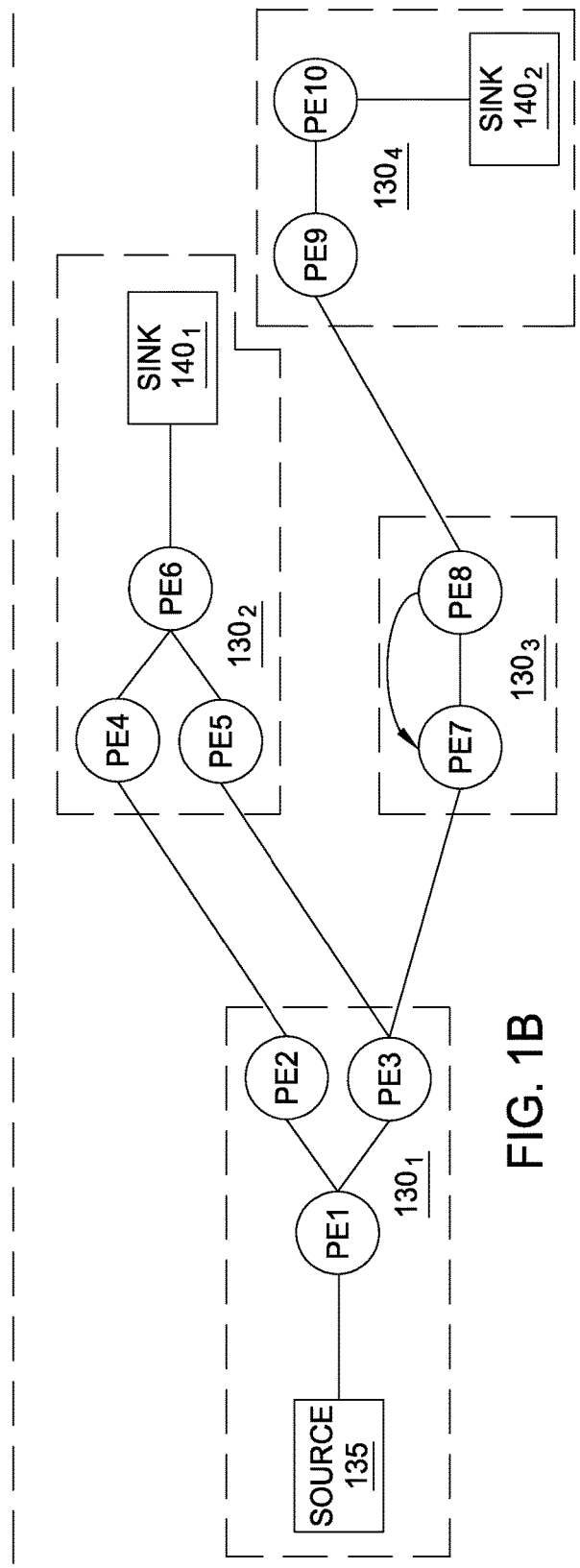

FIGS. 1A-1B illustrate a computing infrastructure configured to execute a stream application, according to one embodiment of the invention. As shown, the computing infrastructure 100 includes a management system 105 and a plurality of hosts $130_{1-4}$—i.e., compute nodes—which are communicatively coupled to each other using one or more communication devices 120. The communication devices 120 may be a server, network, or database and may use a particular communication protocol to transfer data between the hosts $130_{1-4}$. Although not shown, the hosts $130_{1-4}$ may have internal communication devices for transferring data between PEs located on the same host 130. Also, the management system 105 includes an operator graph 132 and a scheduler 134 (i.e., a stream manager). As described in greater detail below, the operator graph 132 represents a stream application beginning from one or more source operators through to one or more sink operators. This flow from source to sink is also generally referred to herein as an execution path. Typically, processing elements receive an N-tuple of data attributes from the stream as well as emit an N-tuple of data attributes into the stream (except for a sink operator where the stream terminates or a source operator where the stream begins). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The scheduler 134 may be configured to monitor a stream application running on the hosts $130_{1-4}$, as well as to change the deployment of the operator graph 132. The scheduler 134 may, for example, move PEs from one host 130 to another to manage the processing loads of the hosts $130_{1-4}$ in the computing infrastructure 100.

FIG. 1B illustrates an example operator graph 132 that includes ten processing elements (labeled as PE1-PE10) running on the hosts $130_{1-4}$. A processing element is composed of one or more operators fused together into an independently running process with its own process ID (PID) and memory space. In cases where two (or more) processing elements are running independently, inter-nodal communication may occur using a network socket (e.g., a TCP/IP socket). However, when operators are fused together, the fused operators can use more rapid intra-nodal communication protocols, such as shared memory, for passing tuples among the joined operators in the fused processing elements.

As shown, the operator graph begins at a source 135 (that flows into the processing element labeled PE1) and ends at sink $140_{1-2}$ (that flows from the processing elements labeled as PE6 and PE10). Host $130_1$ includes the processing elements PE1, PE2, and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on host $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on host $130_3$, which itself shows data tuples flowing to PE8 and looping back to PE7. Data tuples emitted from PE8 flow to PE9 on host $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
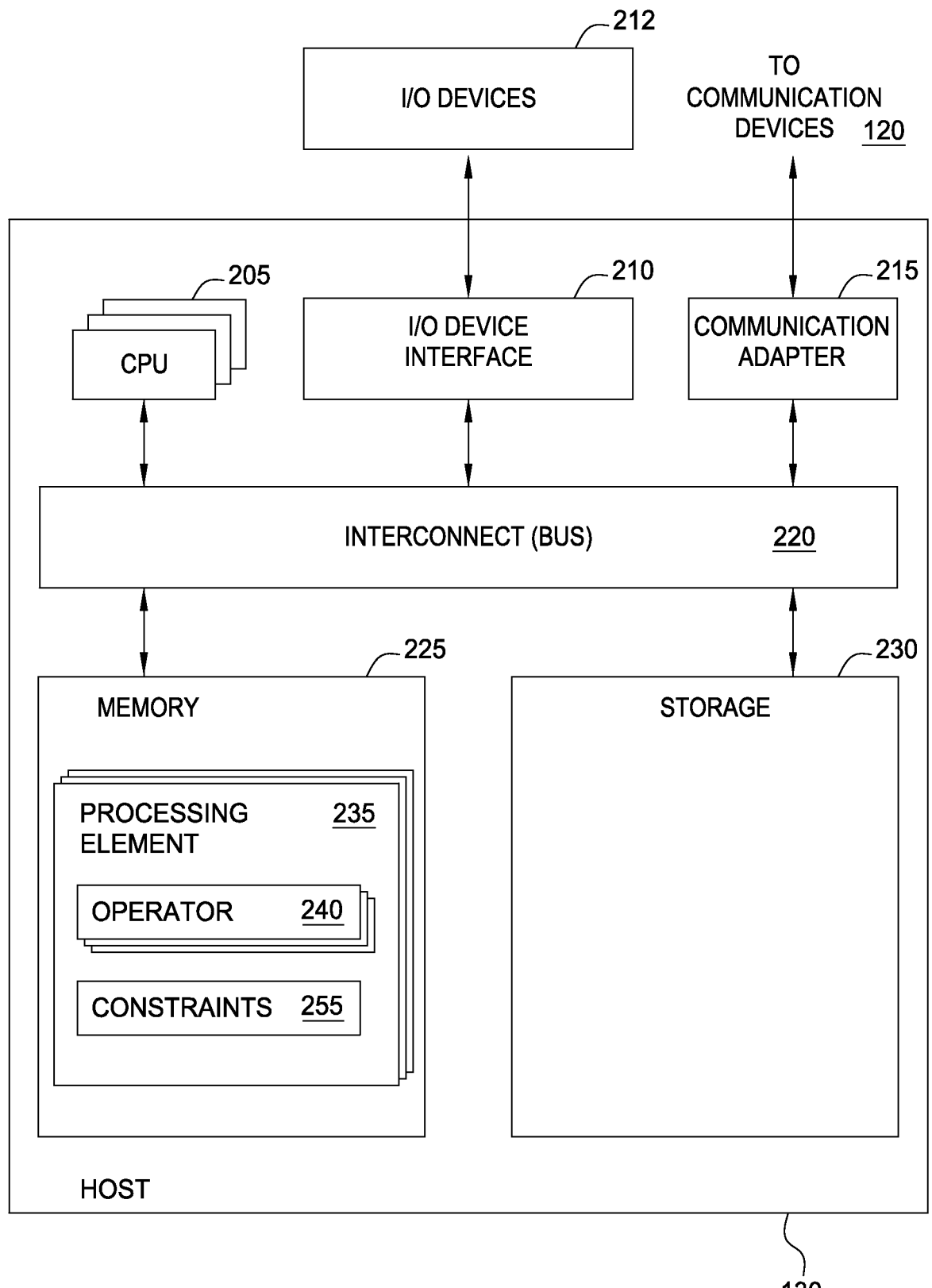
FIG. 2 is a more detailed view of the hosts of FIGS. 1A-1B, according to one embodiment of the invention.

FIG. 2 is a more detailed view of a host 130 of FIGS. 1A-1B, according to one embodiment of the invention. As shown, the host 130 includes, without limitation, at least one CPU 205, a communication adapter 215, an interconnect 220, a memory 225, and storage 230. The host 130 may also include an I/O devices interface 210 used to connect I/O devices 212 (e.g., keyboard, display and mouse devices) to the host 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, communication adapter 215, and memory 225. CPU 205 is representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data. The communication adapter 215 (e.g., a network adapter or query engine) facilitates communication with one or more communication devices 120 that use a particular communication protocol, such as TCP/IP, RDMA protocols, a shared file system protocol, and the like.

In this example, the memory 225 includes multiple processing elements 235. Each PE 235 includes a collection of fused operators 240. As noted above, each operator 240 may provide a small chunk of executable code configured to process data flowing into a processing element (e.g., PE 235) and to emit data to other operators 240 in that PE 235 or to other processing elements in the stream application. PEs 235 may be allocated to the same host 130 or located on other hosts 130 and communicate via the communication devices 120. In one embodiment, a PE 235 can only be allocated to one host 130.

A PE 235 may also include constraints 255 that govern, at least partially, how the scheduler 134 determines a candidate host 130 for a PE 235. For example, a constraint 255 associated with a PE 235 or operator 240 may comprise "isolation" which stipulates that the associated operator 240 cannot share a host 130 with any other PE 235, "co-location" which stipulates that multiple PEs 235 in a group must execute on the same host 130, "ex-location" which stipulates that multiple PEs 235 in a group cannot execute on the same host 130, "explicit host" which stipulates that a PE 235 must be located on a specific host 130 (e.g., host 1300, "non-relocatable" which stipulates that a PE 235 cannot be relocated after being allocated to a host 130, "override" which stipulates that which host 130 must be allocated to which PE 235 and overrides any previous constraints, "indexing the hostpool" which stipulates the host 130 that will execute the PE 235 based on an index value of the hostpool, and the like. Other constraints 255 may be associated with the host 130 instead of the PE 235 or operator 240 such as "overloaded host" which stipulates a maximum number of PEs 235 that may be allocated to the host 130, or "scheduling state" which stipulates whether the host 130 is in a state that supports hosting a new PE 235. However, constraints 255 are not limited to the elements discussed above but may be associated with other elements of the stream application which are considered by the scheduler 134 when allocating PEs 235 to hosts 130.

The example constraints 255 listed above are not intended to be an exhaustive list of all possible constraints 255. Instead, one of ordinary skill in the art will recognize that the embodiments disclosed herein may be used with many different techniques of specifying which host 130 is to be allocated to a particular PE 235 or operator 240.

Figure 3:
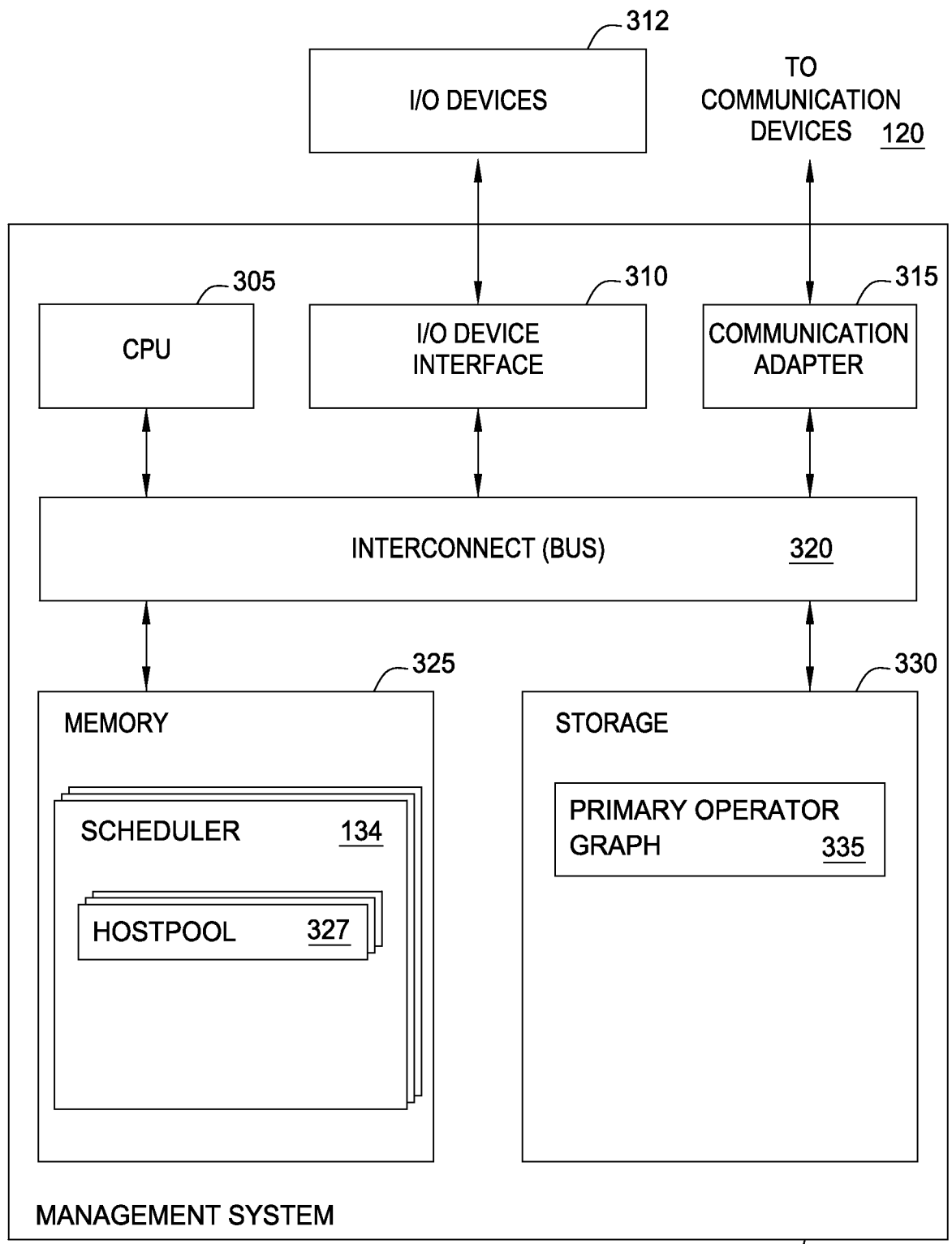
FIG. 3 is a more detailed view of the management system of FIG. 1, according to one embodiment of the invention.

FIG. 3 is a more detailed view of the management system 105 of FIG. 1, according to one embodiment of the invention. As shown, management system 105 includes, without limitation, at least one CPU 305, communication adapter 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, communication adapters 315, and memory 325. Like CPU 205, CPU 305 is included to be representative of a single CPU, multiple CPUs, a single CPU having multiple processing cores, and the like. Memory 325 is generally included to be representative of a random access memory. The communication adapter 315 is configured to transmit data via the communication devices 120 to the hosts 130 using any number of communication protocols. This may the same or different communication protocol used by the PEs 235 to transmit data. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices. The storage includes a primary operator graph 335. The primary operator graph 335, like the one illustrated in FIG. 1B, defines the arrangement of the processing elements, as well as the execution path use by processing element 235 to communicate with a downstream processing element 235.

The memory 325 may include a scheduler 134 that manages one or more hostpools 327. A hostpool 327 may be associated with a particular PE 235, operator 240, or more generally, a job. For example, an application developer may assign a hostpool 327 for each job, thereby associating each PE 235 in that job to the hostpool 327. Alternatively, the developer or scheduler 134 may individually assign each PE 235 or operator 240 to a hostpool 327. In one embodiment, the PE 235 may be associated with one or more hostpools 327 but each operator 240 in the PE 235 may be assigned to only one hostpool 327. The hostpool 327 may also have a predetermined size that stipulates how many hosts 130 may be "pinned" or assigned to the hostpool. This prevents the scheduler 134 from pinning too many hosts 130 to a hostpool 327 to the detriment of other jobs that may be sharing the same computer infrastructure 100. Further, in one embodiment, a hostpool 327 may be indexed much like an array. For example, host $130_1$ and host $130_2$ are pinned to Hostpool_A, Hostpool_A[0] may reference host $130_1$ while Hostpool_A[1] references host $130_2$. Alternatively, the hosts $130_{1-2}$ may be pinned to a particular index value based on what order the hosts $130_{1-2}$ were pinned to the hostpool 327 or by a developer or compiler specifying that a particular PE's host should be located at a particular index value—i.e., the "indexing the hostpool" constraint 255.

Figure 4A:

Other constraints 255 may be associated with the hostpools 327 such as "maximum size" which limits the number of hosts 130 that may be assigned to the hostpool 327, "tagged requirements" which are discussed in FIGS. 4A-B, "exclusive hostpool" which stipulates that the hosts 130 in the hostpool 327 may not be used by any other PEs 235 in any other jobs, and the like.

FIGS. 4A-4B illustrate tables detailing the assignment of hosts to hostpools, according to embodiments of the invention. Specifically, FIG. 4A illustrates tables that identify potential host candidates for a hostpool 327. Table 405 lists hosts 130 (Hosts A-F) that are available to a stream application. Each of the hosts 130 are assigned with a characteristic tag. The tag represents a characteristic of the host 130 such as whether the host 130 has high-memory, multiple processor cores, is compatible with a high-speed communication protocol, recently upgraded, a specific type of processor, a specific operating system, and the like. Moreover, the tag may abstract one or more characteristics by using a simple code word or number. For example, red may indicate a high-memory host 130 while green is a host 130 that has recently been upgraded and has a specific type of processor. Moreover, a host 130 may have multiple tags if it has more than one of the tagged characteristics. For example, Host C and D both have two tags. Additionally, a host 130 may not be assigned any tag or given a default tag if it does not have any of the tagged characteristics.

Table 410 lists three hostpools 327 (Hostpools 1-3) that have a predetermined size and tag. The size indicates the maximum number of hosts 130 that may be pinned to the hostpool 327. In one embodiment, the tag may be used to identify hosts 130 that are eligible to be included into the hostpool 327. For example, a developer may stipulate that a PE 235 must be executed by a high-memory host 130—i.e., the PE 235 must be allocated to a host 130 with a certain characteristic. Accordingly, the developer or scheduler 134 may associate the PE 235 with a hostpool 327 that has the tag that corresponds to the high-memory characteristic. When determining candidate hosts for the PE 235, the scheduler 134 may match the tag of the hostpool 327 in Table 410 with the tag of the host 130 in Table 405.

Table 415 lists the possible hosts 130 that may be matched with each hostpool 327 by matching the tag constraint. Hosts A, B, or C may be pinned to Hostpool 1, Hosts C, E, or F may be pinned to Hostpool 2, and Host D may be pinned to Hostpool 3.

FIG. 4B depicts tables that illustrate the issues that arise when assigning PEs with constraints to hosts. Table 420 pins eligible hosts 130 to a hostpool 327. In this case, a host 130 is pinned based on at least two constraints 255 associated with the hostpool 327: whether it has a matching tag and whether the size of the hostpool 327 is met. As used herein, criteria are different than constraints 255. If a host 130 does not meet a constraint 255, the PE cannot be allocated to it. However, the scheduler 134 may use criteria to choose between multiple hosts that satisfy the constraints 255. For example, the scheduler 134 may use criteria such as selecting the host 130 with the most available processing power or selecting the highest ranked host from a predetermined ranking as the host 130 to pin to the hostpool 327 if there are multiple hosts 130 that satisfy the constraints 255.

For the sake of simplicity, the criterion used in Table 420 to choose between the multiple hosts 130 that satisfy the constraints 255 was alphabetical ordering of the hosts' labels. In this manner, Hosts A and B are pinned to Hostpool 1, Hosts C, D, and E are pinned to Hostpool 2, and Host D is pinned to Hostpool 3. Note that a host 130 may be pinned in multiple hostpools 327 so long as it matches the hostpool's tag.

Table 425 lists possible constraints 255 that may be associated with PEs 235. As shown, each PE 235 is individually assigned to a particular hostpool 327 as well as being associated with at least one constraint 255. However, in one embodiment, a PE 235 may not have any constraints 255 or have multiple constraints 255. Because PE 1 and PE 2 are associated with the same co-located group, they must be allocated to the same host 130. PEs 2-5 are associated with the same ex-located group and thus cannot share the same host 130. That is, PE 2-5 must be allocated to different hosts 130 relative to each other but may be allocated to share a host with a PE 235 not in ex-located Group 1.

Applying the constraints 255 of Table 425 to the hostpools and pinned hosts of Table 420 show that it is an invalid assignment. Specifically, PE 1 and 2 must be located on the same host 130 but are assigned to two different hostpools 327 that do not have any pinned hosts 130 in common. To fix this problem, Host B in Hostpool 1 may be replaced with Host C since Host C has the necessary tags to be eligible for both Hostpool 1 and 2. In this manner, both PE 1 and PE 2 may be allocated to the same host 130—i.e., Host C.

However, this does not solve all the constraints 255. PE 2-5 must be allocated to separate hosts 130. Specifically PE 2, 4, and 5 are in Hostpool 2 and must each use a separate host 130; however, because Host D is in Hostpool 2, one of PE 2, 4, or 5 must be allocated to Host D which is also allocated to PE 3. To solve this problem, Host D in Hostpool 2 may be replaced by Host F. Table 430 lists one solution that satisfies both constraints 255—i.e., the tag characteristics required by the hostpools 327 and the ex-locate or co-locate groups associated with the PEs 235. PE 1 may be allocated to either Host A or C. PEs 2, 4, and 5 may be allocated to Hosts C, E, or F but cannot share a host 130. PE 3 is allocated to Host D.

Figure 4A:
Figure 4A:
Figure 5:
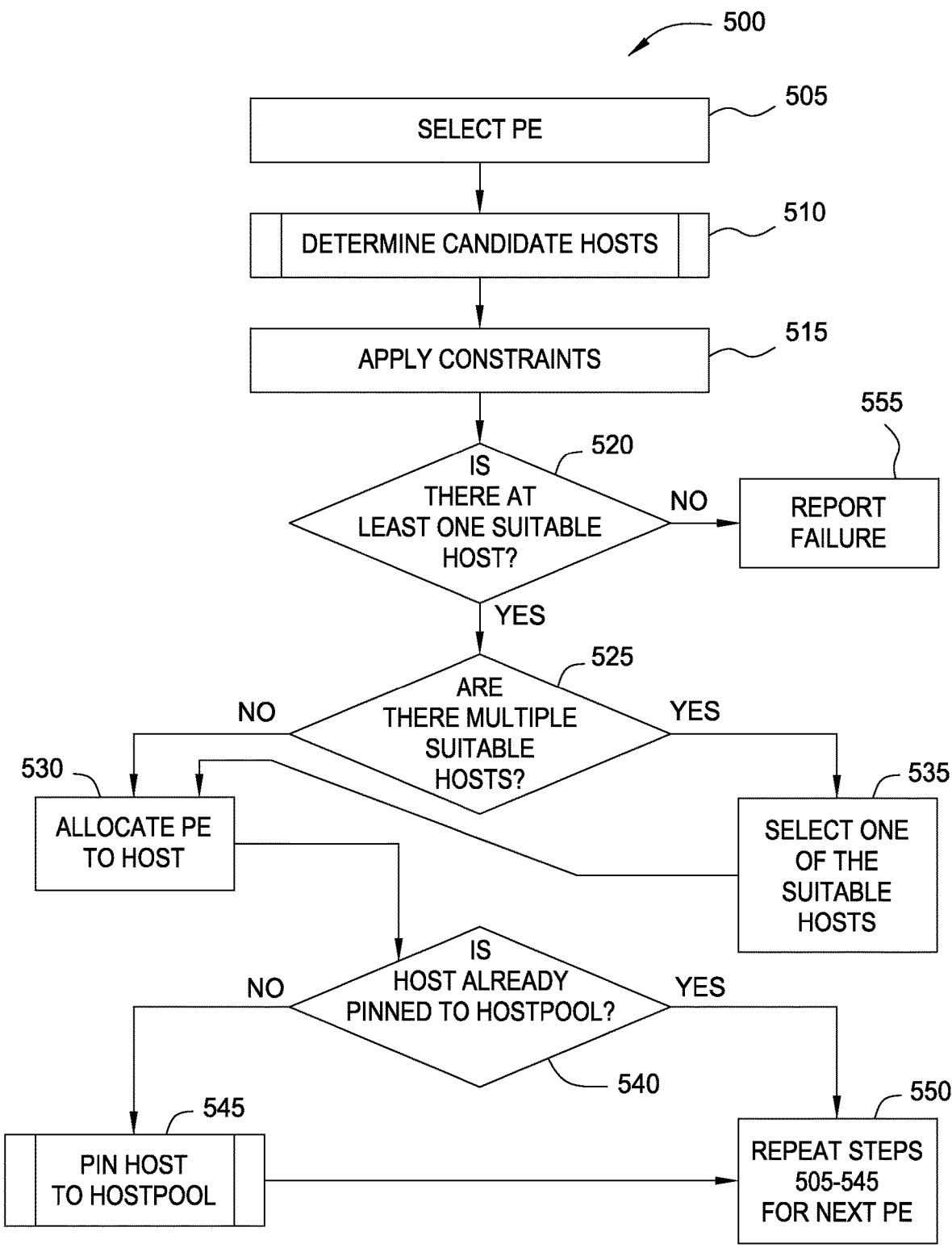
FIG. 5 is a flow diagram illustrating the assignment of one or more hosts to a hostpool, according to embodiments of the invention.

FIG. 5 is a flow diagram illustrating the assignment of one or more hosts to a hostpool, according to embodiments of the invention. The technique 500 illustrated in FIG. 5 avoids the issues shown in the tables of FIG. 4. The hostpool 327 provides a developer flexibility to add constraints 255 to a PE 235 yet without having to assign each individual PE 235 to a specific host 130. Specifically, the technique waits to pin the host 130 to the hostpool 327 after the candidate hosts are found and the constraints 255 have been satisfied.

At block 505, the scheduler 134 selects a PE 235 to allocate to a host 130. The scheduler may select a PE 235 that is associated with a job or choose a PE 235 based on the expected difficulty of placing the PE 235 on a host—i.e., the PE 235 is associated with the most number of constraints. However, this invention is not limited to a particular method of selecting a PE from the plurality of PEs that may make up a stream application. In one embodiment, at block 505, the scheduler 134 may use the techniques disclosed in an application by the same inventor that is co-pending with the current application entitled "DYNAMICALLY CONFIGURABLE PLACEMENT ENGINE" application Ser. No. 13/308,800 filed Dec. 1, 2011 (which is herein incorporated by reference) for selecting the appropriate PE 235.

At block 510, the scheduler 134 determines the candidate hosts that may be assigned to a hostpool 327. That is, after selecting the PE 235, the scheduler 134 may determine the available hosts in the computing infrastructure 100 that may be pinned to the hostpool 327 assigned to the PE 235. In one embodiment, the scheduler 134 identifies the hosts 130 that have a similar tag to that of the hostpool 327. As mentioned above, the tags on the hosts 130 may represent a specific characteristic or group of characteristics of the host 130.

In one embodiment, the hostpool 327 may be exclusive—i.e., only the processing elements 235 that have the tag associated with the hostpool 327 can be allocated to compute nodes or hosts 130 pinned to the hostpool 327. Stated differently, the hosts 130 in an exclusive hostpool cannot be used by PEs 235 that do not have a tag that is associated with the hostpool. Alternatively or additionally, PEs 235 for previous or subsequent jobs are also unable to use the hosts 130 assigned to an exclusive hostpool 327, regardless if they have the appropriate tag or not.

Candidate hosts may also be found by using other constraints 255 besides similar tags. In one embodiment, the scheduler 134 may select hosts 130 as candidate hosts only if they are not exclusively being used by other stream applications or jobs. One of ordinary skill in the art will recognize the different constraints 255 that may be used to exclude particular hosts of in a computing system.

At block 515, the candidate hosts found in block 510 are further compared to the constraints 255 associated with the selected PE 235. For example, if the selected PE 235 must be co-located with a second PE 235, the scheduler 134 may determine whether the second PE 235 has already been allocated to a host 235. If so, all other candidate hosts may be eliminated except the host 130 that is allocated to the second PE 235. Similarly, if the constraint 255 is to isolate the selected PE 235, then the candidate hosts may be selected from the hosts 130 that do not have any other PEs 235 located on them. Alternatively, if a constraint 255 requires that the selected PE 235 be ex-located with the second PE 235, then the scheduler 134 may not consider as candidate host the host 130 where the second PE 235 is allocated.

In one embodiment, the scheduler 134 may consider a plurality of constraints 255. For example, the selected PE may be co-located with a second PE 235 but ex-located with a third PE 235—e.g., PE 2 of Table 425. The scheduler 134 would then narrow the candidate hosts using both of these constraints 255.

In one embodiment, the constraints 255 may include a constraint 255 of the host 130; for example, if the host 130 is overloaded. If the scheduler 134 has already allocated the maximum number of PEs 235 to the host 130 then it may be removed from consideration as a candidate host. Accordingly, the scheduler 134 may consider constraints 255 associated with a host 130 along with one or more constraints 255 assigned to a PE 235 or operator 240.

Although blocks 510 and 515 are shown as two distinct blocks, in some embodiments, one or more constraints 255 associated with a PE 235, operator 240, or host 130 may be also considered when determining the candidate hosts. That is, some constraints 255 may be used to find the candidates hosts (i.e., block 510) while other constraints 255 are used to find a suitable host (i.e., block 515).

Figure 6:
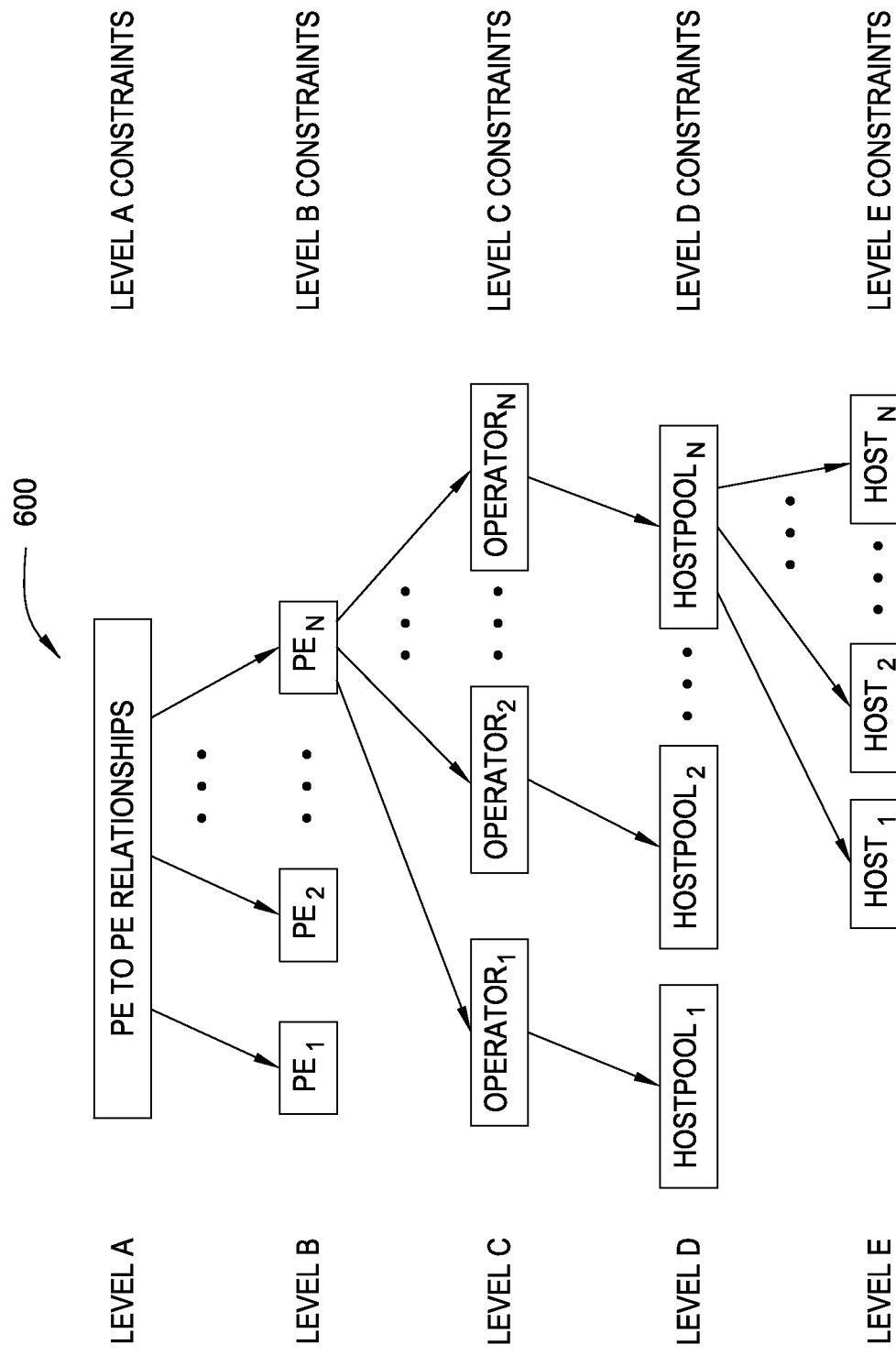
FIG. 6 illustrates a constraint tree for applying constraints, according to one embodiment of the invention.

FIG. 6 illustrates a constraint tree for applying constraints, according to one embodiment of the invention. Notably, a constraint tree 600 is only one technique of determining if a host 130 satisfies all the constraints 255. The constraint tree 600 divides up the different structures in a stream application into multiple levels to form a hierarchical relationship. The top level—Level A—represents the relationship between PEs. Level B includes the constraints that may be assigned to an individual PEs 235. As mentioned previously, a PE 235 may have one or more fused operators 240 which are represented by Level C of the tree 600.

In one embodiment, each operator 240 associated with a PE 235 is assigned to only one hostpool 327 while a PE 235 may be associated with one or more hostpools 327. Level D shows that the operators 240 associated with $PE_N$ are each associated with only one hostpool 327. However, the operators 240 may be associated with the same hostpool 327. Finally, each hostpool 327 may include one or more hosts 130—i.e., Level E. For the sake of clarity, many of the hierarchical relationships of the different levels, such as the operators associated with $PE_1$ and $PE_2$, are omitted from the figure.

In one embodiment, the scheduler 134 may use the constraint tree 600 to determine suitable hosts—i.e., hosts 130 that meet Level A-E constraints. The constraint tree 600 is a graphical representation of the different types of constraints that may be used to allocate the selected PE 235 to a host 130. That is, each constraint tree 600 may look different for each PE 235. Each level represents different types of constraints that may be checked by the scheduler 134. For a currently selected PE 235, the scheduler 134 may apply Level E constraints—i.e., constraints 255 associated with hosts 130. For example, the scheduler 134 may apply Level E constraints such as whether the host 130 is overloaded or if the host 130 is being used exclusively by a different job other than the current one selected at Level A. After determining which hosts 130 meet Level E constraints, the scheduler 134 may return to Level D to apply Level D constraints, such as whether the hosts 130 selected from Level E have the same tag as the Level D hostpool 327 or if the size requirements of the hostpool 327 have been met. After applying Level D constraints, the scheduler 134 returns the candidate hosts to Level C—i.e., block 510 of FIG. 5.

For each of the operators 240 in the selected PE 235, the scheduler 134 may apply Level C constraints associated with the operators 240 such as whether the operators 240 must run on a specific host 130 or whether one of the operators 240 should be the only operator 240 running on the host 130. The scheduler 134 checks the Level C constraints for each of the operators 240 against the candidate hosts returned from Level D. The hosts 130 that satisfy the constraints 255 for at least one of the operators 240 are returned to Level B where the Level B constraints are applied. For example, the scheduler 134 may perform an Intersect function to determine if any of the hosts 130 that satisfy all of the constraints of at least one of the operators 240 of Level C also satisfies all the constraints 255 of all of the operators 240. Additionally or alternatively, the Level B constraints may include determining whether the PE 235 is non-relocatable or if there is a host 130 that overrides any of the other constraints 255.

After determining which host or hosts 130 satisfy the constraints for Levels B-E, the scheduler 134 determines whether the hosts 130 also satisfy the constraints of Level A such as ex-locate or co-locate. That is, if $PE_1$ (e.g., the currently selected PE) and $PE_2$ must be co-located, then at Level A the scheduler 134 may perform an Intersect function to determine whether the two PEs 235 have at least one host 130 in common that meets all the Level B-D constraints for the respective PEs 235. If so, that host or hosts 130 become the suitable hosts for $PE_1$—i.e., block 520 of FIG. 5. In this manner, the scheduler 134 may use the constraint tree 600 to ensure that all constraints 255 are satisfied to identify at least one suitable host for a selected PE 235.

Returning to FIG. 5, if after applying the constraints 255 to the candidate hosts, the scheduler 134 is unable to find at least one suitable candidate at block 520 then the assignment of that stream application fails—i.e., the scheduler 134 issues a fault at block 555. For example, if the selected PE 235 must be co-located with a second PE 235 but the host 130 for the second PE 235 is not a candidate host (e.g., does not have a similar tag to the hostpool 327 associated with the selected PE 235) then the stream application reports a failure. In one embodiment, the failure of the scheduler 134 to allocate one PE 235 to a host 130 causes the entire assignment of the stream application to fail. That is, the current constraints 255 prevent the stream application from executing. In another embodiment, the scheduler 134 may use the techniques disclosed in an application by the same inventor that is co-pending with the current application entitled "CANDIDATE SET SOLVER WITH USER ADVICE" application Ser. No. 13/308,881 filed Dec. 1, 2011 (which is herein incorporated by reference) for overcoming a fault and placing every PE 235 in the stream application onto a suitable host.

At block 525, the scheduler determines if there are multiple suitable hosts. As used herein, a "suitable host" is a host 130 that meets all the constraints 255 of the stream application which, in one embodiment, may include constraints 255 associated with the hostpool 327, PE 235, or operator 240. Because more than one of the candidate hosts selected in block 510 may meet the constraints applied in block 515, the scheduler 134 may choose between the suitable hosts at block 535 based on one or more criteria. In one embodiment, the scheduler 134 may select the suitable host with the lowest usage of CPU or the suitable host that uses the fastest communication protocol for inter-host communications. In another embodiment, the scheduler 134 may select the suitable host that the PE 235 has previously been allocated during a different job or instance of the same job. Alternatively, the host 130 may be chosen at random. In another embodiment, the scheduler 134 may the use the techniques discussed in the co-pending application "DYNAMICALLY CONFIGURABLE PLACEMENT ENGINE" application Ser. No. 13/308,800 which was mentioned previously. The invention, however, is not limited to any particular method of selecting a host 130 from a plurality of suitable hosts.

However, if there is only one suitable host, the scheduler may automatically allocate the selected PE 235 to that suitable host.

At block 540, before pinning the suitable host to the hostpool 327 associated with the PE 235, the scheduler 134 may first determine if the host 130 is already pinned to the hostpool 327. If not, the scheduler 134 may pin (or assign) the suitable host to the hostpool 327. Part of this process may require assigning an index value to the host 130 in the hostpool 327 which will be discussed below with reference to FIG. 8. After pinning the suitable host or determining that the suitable host is already included in the hostpool, at block 550 the technique 500 may be repeated for the next selected PE 235. Specifically, the technique 500 may continue for each PE 235 in the stream application.

Figure 7:
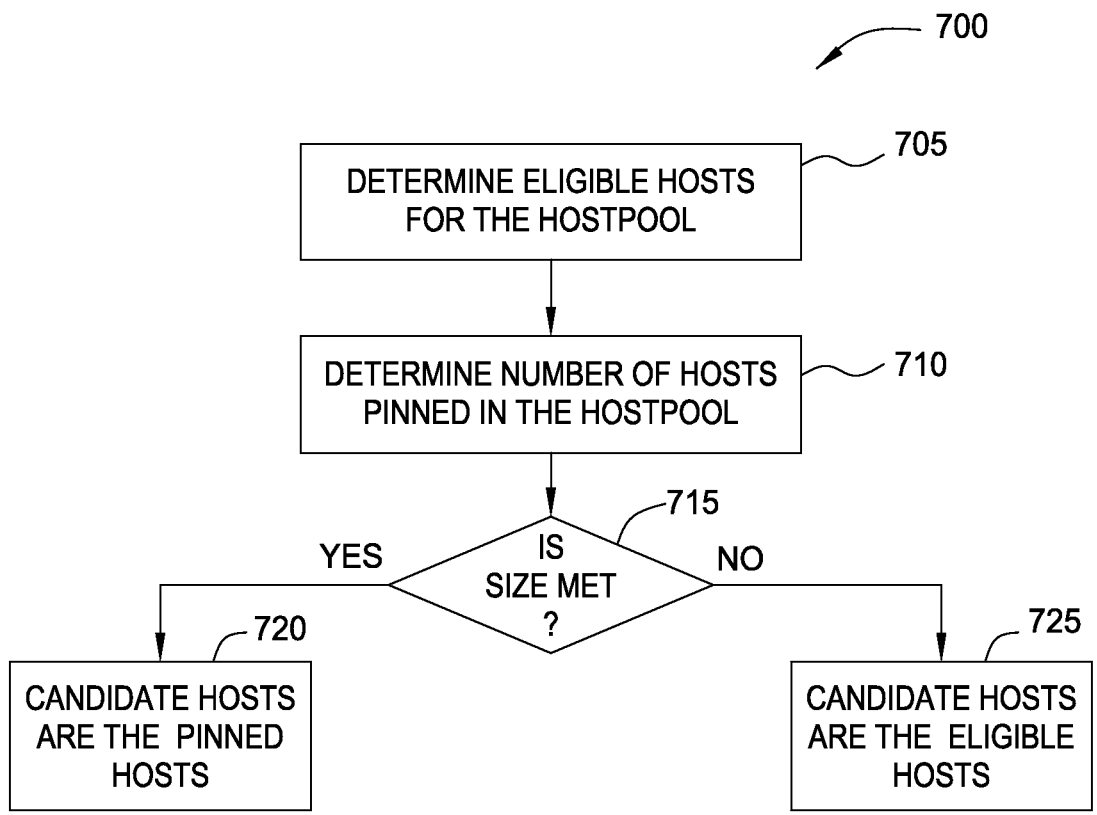
FIG. 7 is a flow diagram illustrating the process of determining candidate hosts for a processing element, according to one embodiment of the invention.

FIG. 7 is a flow diagram illustrating the process of determining candidate hosts for a processing element, according to one embodiment of the invention. Specifically, FIG. 7 describes in more detail block 510 of FIG. 5 which determines the candidate hosts for a hostpool 327. At block 705, the scheduler 134 identifies the hostpool 327 associated with the selected PE 235 and determines eligible hosts for that hostpool 327. For example, the scheduler 134 may use the tags assigned to both the hostpool 327 and the hosts 130 to identify the eligible host.

In one embodiment, the tag may be associated with only the selected PE 235 rather than the hostpool 327 or with both the selected PE 235 and the hostpool 327. In this manner, the PE 235 could be matched with the host 130 that has its required characteristics. For example, if the tag assigned to the PE 235 is based on a requirement for executing the PE 235 when the stream application is operating as designated by a stream application developer—e.g., required processor speeds, availability, memory needs, etc.—then the assigned tag may match a tag from a host 130 that can meet the need of the selected PE 235. Further, if only one hostpool 327 is associated with the selected PE 235, then by consequence of matching a host 130 to the PE 235, the host 130 is also matched to the corresponding hostpool 327. Accordingly, as used herein "eligible hosts" refer to hosts 130 that have tags that match the tag of either the selected PE 235 or its corresponding hostpool 327.

At block 710, the scheduler determines the current number of hosts 130 pinned to the hostpool 327. For example, if other PEs 235 associated with the current hostpool 327 have already been allocated to a host 130, thereby pinning the host 130 to the hostpool 327, then the available slots of the hostpool 327 have been decreased by the number of pinned hosts 130.

In one embodiment, the hosts 130 pinned to the hostpool 327 may be divided into two categories: host 130 that are "pinned but not slotted", and hosts 130 that are "pinned and slotted". Pinned hosts that are not slotted means that the hosts 130 do not need to be placed at a specific index value in the hostpool 327. As mentioned previously, a hostpool 327 may be indexed much like a data array such that, for example, hostpool_A[0] references Host D while hostpool_A[1] references Host A. This causes the associated hosts to become slotted. For some stream applications, a PE 235 may be assigned to a host 130 in a hostpool 327 that corresponds to the specific index value—e.g., 0, 1, 2, 3, etc. up to the maximum size of the hostpool 327. In this manner, a developer may instruct the scheduler 134 to allocate a PE 235 to the host 130 pinned at hostpool[N], where N is an index value of the hostpool 327. Once that PE 235 is selected, the scheduler 134 may proceed with the technique 500 of FIG. 5 and find a suitable host. That host 130 would then be pinned at hostpool[N] as specified by the developer. The ex-locate or co-locate constraints may also be used to also achieve hostpool indexing. For example, if the developer wants both PE1 and PE2 to be co-located on a host 130, the compiler may choose to index that host 130 at Hostpool_A[3]. The scheduler 134 finds a suitable host that satisfies the constraints 255 of PE1, PE2, and Hostpool_A and then assigns that host 130 to Hostpool_A[3]. Neither the developer nor the compiler need to know which actual host will be referenced by Hostpool_A[3]. Instead the scheduler 134 determines the particular host to index (or slot) in Hostpool_A[3] when establishing the stream. In this manner, the hostpool 327 saves the developer the time needed to assign each host 130 to a PE 235. Instead, the developer need only provide the constraints 255 to the scheduler 134 which then sorts through the constraints 255 (and criteria if necessary) to determine whether there is a suitable host.

In one embodiment, when a host 130 is added to either the pinned but not slotted or pinned and slotted host sets, it is considered a member of the hostpool 327 and counts against the maximum limit of hosts 130 that may be pinned to the hostpool 327 as defined by the size of the hostpool 327. Accordingly, when determining the current occupancy of a hostpool 327, the scheduler may use the union of the pinned but not slotted and the pinned and slotted host sets.

In one embodiment, the hostpool 327 may include methods for maintaining the two different types of pinned hosts 130. For example, both the pinned but not slotted and the pinned and slotted hosts 130 are eligible hosts for the hostpool 327, but a host 130 cannot be both a pinned/slotted host 130 and a pinned/not slotted host 130. Moreover, a host 130 may be changed to a different type. Assume that Host B is already pinned but not slotted to Hostpool A (i.e., Host B is "floating" in Hostpool A without a particular index value), but the currently selected PE 235 requires its host to be at index value 2. If Host B meets the constraints 255 of the current PE 235, the scheduler 134 may also slot Host B to index value 2. As part of this process, the scheduler 134 may add Host B to the pinned and slotted host set in Hostpool A and remove it from the pinned but not slotted host set.

In one embodiment, if the scheduler 134 attempts to move a pinned and slotted host 130 to a different index value, this may cause the assignment to fail. For example, assume that the scheduler 134 previously allocated PE1 to Host D which is then pinned and slotted at HostpoolA[2]. Later, the scheduler may try to allocate PE2, which must be co-located with PE1, to HostpoolA[2]; however, if Host D does not meet one of the constraints 255 associated with PE2, then attempting to remove Host D from its slot to replace it with a host 130 that does meet the constraints 255 may cause the assignment to fail. That is, in this embodiment, pinned and slotted hosts cannot be moved.

At block 715, the scheduler 134 determines whether the total number of pinned hosts 130 equals a maximum size of the hostpool 327. If so, at block 720, the candidate hosts are the hosts 130 already pinned in the hostpool 327. That is, the scheduler 134 is limited to only the pinned hosts when it applies the constraints 255 in block 515 of FIG. 5 to determine a suitable host. If the number of pinned hosts is not yet equal to the size of the hostpool 327, at block 725 the scheduler 134 determines that the candidate hosts are all the eligible host—i.e., all hosts 130 whose characteristics/tag match the requirements of the PEs 235 in the hostpool 327. For example, a hostpool 327 may be limited in size to three pinned hosts 130 but there may be 100 hosts 130 with the same tag as the hostpool 327. If the size of the hostpool 327 is less than three, then all 100 eligible hosts are candidate hosts. However, if the size is met, there are only three candidate hosts—i.e., the hosts 130 already pinned to the hostpool 327.

In one embodiment, the hostpool 130 may have an associated method that returns all possible hosts 130 that may be pinned to a particular index value. If the scheduler 134 needs to determine what host may be at Hostpool[N], wherein N is an index value, the method determines what type of host 130 occupies that index value. If there is a host 130 that has been slotted for that index, then the method returns only that host 130 as the candidate host. If there is not a host 130 that has been slotted for that index and the size of the hostpool 327 has been met, then the method returns all the pinned but not slotted hosts in the hostpool 327 as the candidate hosts for that index value. For example, if Host B and C are both pinned but not slotted—i.e., Hosts B and C are assigned to the hostpool but are floating without a particular index value—in response to calling the method for index 2, both Host B and C would be returned as possible candidates. Because Hosts B and C are in the pinned but not slotted host set, the scheduler 134 may slot Hosts B and C to and index value.

If the host 130 at the index value is pinned but not slotted and the size has not been met, the method returns all eligible hosts except for the hosts 130 that are already pinned and slotted. Thus, the returned set of candidate hosts represents all possible hosts 130 that may either be added to the hostpool 327 at that index. In sum, if a PE 235 must be allocated to a host at hostpool[N], the method returns to the scheduler 134 only the subset of eligible hosts that may be placed at that index value N. This method may be useful when in block 510 of FIG. 5 the scheduler 134 is determining the candidate hosts when the scheduler 134 must handle an indexing constraint 255—i.e., ex-locate, co-locate, indexing the hostpool, etc.

Figure 8:
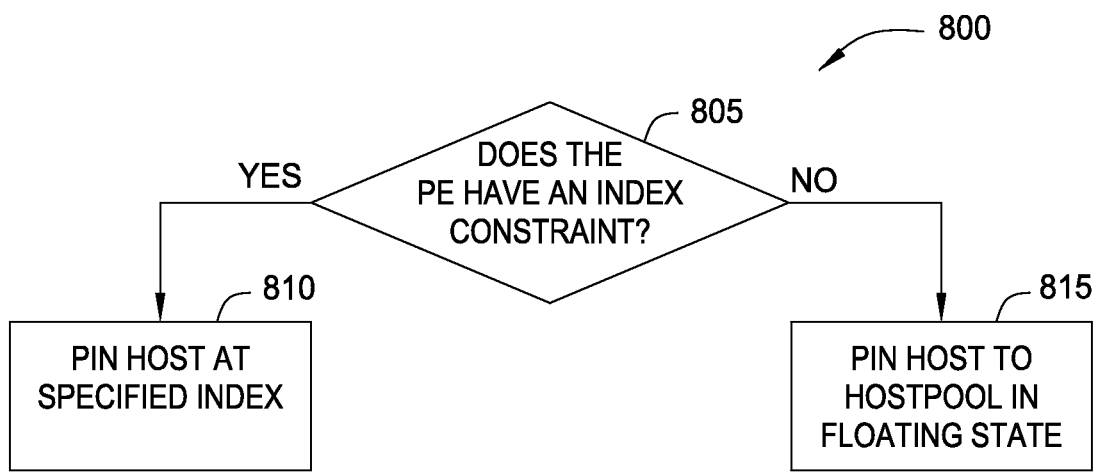
FIG. 8 is a flow diagram illustrating the process of assigning or pinning a host to an index value of a hostpool, according to one embodiment of the invention.

FIG. 8 is a flow diagram illustrating the process of assigning or pinning a host to an index value of a hostpool, according to one embodiment of the invention. Specifically, FIG. 8 describes in more detail block 545 of FIG. 5 which pins a suitable host to the hostpool 327. At block 805, the scheduler 134 may determine whether the suitable host has an index constraint. As mentioned previously, an index constraint may be directly coded into the stream application by a developer or be assigned by a compiler in response to an ex-locate or co-locate constraint. In either case, the scheduler 134 may have already determined that the suitable host has met this constraint 255.

If the constraint 255 is satisfied, at block 810 the scheduler 134 may pin the suitable host to the specified index value assuming that another pinned and slotted host does not already occupy that index value. Additionally, the scheduler 134 may add the host 130 to the pinned and slotted host set so that further assignments will not remove the host 130 from that index value. Further, the scheduler 134 may remove a pinned but not slotted host that is in the slot (or index value) needed to satisfy the constraint. If the suitable host is not associated with an index constraint, then the scheduler may pin the suitable host to any index value that is not occupied by a pinned and slotted host. For example, the index value may have been previously unoccupied or may have been occupied by a pinned but not slotted host. Further, the scheduler 134 may add the suitable host to the pinned but not slotted host set.

CONCLUSION

The present embodiments establish a stream application that may use relatively small chunks of executable code configured to process data tuples flowing into a processing element. A scheduler allocates the processing elements to individual compute nodes or hosts for execution. However, the stream application may assign various constraints that stipulate which hosts are suitable for a particular processing element. To assign hosts to processing elements such that the constraints are satisfied, the scheduler may use hostpools associated with the processing elements. Once a host is identified that satisfies the constraints, it may be pinned at a particular index within the hostpool.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product to programmatically allocate a processing element of a stream application to a compute node, based on hostpools and a hierarchy of constraints, the computer program product comprising:
   a non-transitory computer-readable medium having computer-readable program code embodied therewith, the computer-readable program code executable by one or more computer processors to:
      provide a plurality of processing elements of the stream application, the plurality of processing elements including the processing element and pertaining to a requested compute job, wherein each of the plurality of processing elements includes one or more operators fused into a single process uniquely identifiable via a process identifier and having an associated memory space, wherein operators of different processing elements communicate via an inter-nodal communication protocol, wherein operators of the same processing element communicate via an intra-nodal communication protocol;
      provide an operator graph defining an execution path through the plurality of processing elements, the execution path specifying that at least one of the processing elements receives data from at least one upstream processing element and transmits data to at least one downstream processing element, and wherein the plurality of processing elements are assignable to a plurality of compute nodes in a distributed computing environment, the plurality of compute nodes including the compute node;
      provide a constraint tree defining the hierarchy of constraints, the hierarchy of constraints including, for each of a plurality of levels of the stream application, a respective constraint specific to the respective level, the plurality of levels including a host level, a hostpool level, an operator level, a processing-element level, and an element-relationship level;
      provide, using a plurality of hostpools, support for deferring assignment of processing elements until runtime, which provides a greater measure of flexibility in assigning processing elements to compute nodes than is afforded by assigning, prior to runtime, processing elements to compute nodes in an absence of the plurality of hostpools, wherein providing the support includes assigning, to the processing element, a hostpool selected from the plurality of hostpools, each of which has a distinct set of resource type requirements, wherein the hostpool is to define a set of compute nodes that have been assigned to the plurality of processing elements, wherein the constraint tree specifies one or more resource type requirements of the hostpool at the hostpool level of the hierarchy;
      determine whether a number of compute nodes previously assigned to the hostpool is equal to a predetermined size of the hostpool, wherein the predetermined size is a maximum number of compute nodes that can be assigned to the hostpool;
      determine, during runtime, a plurality of candidate compute nodes in the distributed computing environment to dynamically assign to the hostpool, wherein the constraint tree specifies a respective one or more resource type requirements satisfied by each candidate compute node at the host level of the hierarchy;
      determine, according to a predefined final selection criterion, and based on a set of one or more hosting constraints associated with the processing element and specified by the constraint tree at the processing-element level of the hierarchy, a final compute node from the candidate compute nodes, the set of one or more hosting constraints specifying whether multiple processing elements in a specified group selected from the plurality of processing elements are permitted to execute on the same hosting compute node;
      assign the processing element to the final compute node via the hostpool, including pinning the final compute node to the hostpool and slotting the final compute node to a specific index within the hostpool; and
      subsequent to assigning the processing element to the final compute node, generate a set of results by executing the stream application based on input comprising a set of data records, wherein generating the set of results includes incrementally generating each result based on a respective data record while the respective data record is in flight, wherein the result is output.

2. The computer program product of claim 1, wherein the set of one or more hosting constraints comprise at least one of a shared location on a candidate compute node with a second processing element, a location on a candidate compute node without any other processing element, a location on a candidate compute node that is not shared by the second processing element, a location on a candidate compute node assigned to a specified index value of a hostpool, and a location on a specified candidate compute node.

3. The computer program product of claim 1, further comprising:
   determining whether the final compute node should be assigned to the specific index in the selected hostpool;
   wherein if so, the final compute node is assigned, by a scheduler, to the selected hostpool at the specific index.

4. The computer program product of claim 1, wherein the selected hostpool precludes assignment, to the final compute node, of any processing elements not demanding a resource type requirement associated with the selected hostpool.

5. A system to programmatically allocate a processing element of a stream application to a compute node, based on hostpools and a hierarchy of constraints, the system comprising:
   a computer processor; and
   a memory containing a program that, when executed on the computer processor, performs an operation comprising:
      providing a plurality of processing elements of the stream application, the plurality of processing elements including the processing element and pertaining to a requested compute job, wherein each of the plurality of processing elements includes one or more operators fused into a single process uniquely identifiable via a process identifier and having an associated memory space, wherein operators of different processing elements communicate via an inter-nodal communication protocol, wherein operators of the same processing element communicate via an intra-nodal communication protocol;
      providing an operator graph defining an execution path through the plurality of processing elements, the execution path specifying at least one of the processing elements receives data from at least one upstream processing element and transmits data to at least one downstream processing element, wherein the plurality of processing elements are assignable to a plurality of compute nodes in a distributed computing environment, the plurality of compute nodes including the compute node;

providing a constraint tree defining the hierarchy of constraints, the hierarchy of constraints including, for each of a plurality of levels of the stream application, a respective constraint specific to the respective level, the plurality of levels including a host level, a hostpool level, an operator level, a processing-element level, and an element-relationship level;

providing, using a plurality of hostpools, support for deferring assignment of processing elements until runtime, which provides a greater measure of flexibility in assigning processing elements to compute nodes than is afforded by assigning, prior to runtime, processing elements to compute nodes in an absence of the plurality of hostpools, wherein providing the support includes assigning, to the processing element, a hostpool selected from the plurality of hostpools, each of which has a distinct set of resource type requirements, wherein the hostpool is to define a set of compute nodes that have been assigned to the plurality of processing elements, wherein the constraint tree specifies one or more resource type requirements of the hostpool at the hostpool level of the hierarchy;

determining whether a number of compute nodes previously assigned to the hostpool is equal to a predetermined size of the hostpool, wherein the predetermined size is a maximum number of compute nodes that can be assigned to the hostpool;

determining, during runtime, a plurality of candidate compute nodes from a plurality of compute nodes in a distributed computing environment to dynamically assign to the hostpool, wherein the constraint tree specifies a respective one or more resource type requirements satisfied by each compute node at the host level of the hierarchy;

determining, according to a predefined final selection criterion, and based on a set of one or more hosting constraints associated with the processing element and specified by the constraint tree at the processing-element level of the hierarchy, a final compute node from the candidate compute nodes, the set of one or more hosting constraints specifying whether multiple processing elements in a specified group selected from the plurality of processing elements are permitted to execute on the same hosting compute node;

assigning the processing element to the final compute node via the hostpool, including pinning the final compute node to the hostpool and slotting the final compute node to a specific index within the hostpool; and subsequent to assigning the processing element to the final compute node, generating a set of results by executing the stream application based on input comprising a set of data records, wherein generating the set of results includes incrementally generating each result based on a respective data record while the respective data record is in flight, wherein the result is output.

6. The system of claim 5, wherein the set of one or more hosting constraints comprise at least one of a shared location on a candidate compute node with a second processing element, a location on a candidate compute node without any other processing element, a location on a candidate compute node that is not shared by the second processing element, a location on a candidate compute node assigned to a specified index value of a hostpool, and a location on a specified candidate compute node.

7. The system of claim 5, further comprising:
determining whether the final compute node should be assigned to the specific index in the selected hostpool;
wherein if so, the final compute node is assigned, by a scheduler, to the selected hostpool at the specific index.

8. The system of claim 5, wherein the selected hostpool precludes assignment, to the final compute node, of any processing elements not demanding a resource type requirement associated with the selected hostpool.

9. The system of claim 5, wherein the plurality of candidate compute nodes includes:
(i) a first candidate compute node that is designated as a candidate upon determining that: (A) the number of computer nodes previously assigned to the hostpool is equal to the predetermined size, (B) the hostpool and the first candidate compute node share at least one resource type, and (C) the first candidate compute node is from among the compute nodes previously assigned to the hostpool; and
(ii) a second candidate compute node that is designated as a candidate upon determining that: (A) the number of computer nodes previously assigned to the hostpool is less than the predetermined size and (B) the hostpool and the second candidate compute node share at least one resource type;
wherein the stream application provides a measure of granularity with which a process flow of data through the stream application is controlled;
wherein the process flow of data through the stream application being controlled comprises both: (i) which operators are contained in the stream application and (ii) what order the operators are performed in, being dynamically altered;
wherein the predefined final selection criterion comprises, in respective instances: (i) the candidate compute node having a lowest processor utilization among the plurality of candidate compute nodes; (ii) the candidate compute node configured to use a fastest communication protocol, among the plurality of candidate compute nodes, for inter-host communications; and (iii) the candidate compute node to which the processing element was previously assigned for a prior instance of the requested compute job.

10. The system of claim 9, wherein the final compute node is determined by a management system, wherein the management system includes the operator graph and a scheduler, wherein the management system is configured to perform the determining of the final compute node based on:
(i) a co-location constraint stipulating that multiple processing elements in a first specified group must execute on the same hosting compute node;
(ii) an isolation constraint stipulating a location on a candidate compute node without any other processing element;
(iii) an ex-location constraint stipulating that multiple processing elements in a second specified group cannot execute on the same hosting compute node;
(iv) an indexing constraint stipulating a location on a candidate compute node assigned to a specified index of a hostpool;

(v) an override constraint stipulating a location on a specified candidate compute node;

(vi) a non-relocatable constraint stipulating that the final compute not cannot be relocated after assignment;

(vii) an overloaded-host constraint stipulating a maximum count of processing elements that can be assigned to the final compute node for the processing element to be assigned to the final compute node; and (viii) a scheduling-state constraint stipulating whether the final compute node is in a state that supports a new processing element being assigned to the final compute node, the new processing element comprising the assigned processing element.

11. The system of claim 10, further comprising:
determining whether the final compute node should be assigned to a specific index value in the selected hostpool;
wherein if so, the final compute node is assigned, by the scheduler, to the selected hostpool at the specific index value.

12. The system of claim 11, wherein the selected hostpool precludes assignment, to the final compute node, of any processing elements not demanding a resource type requirement associated with the selected hostpool;
wherein the operation further comprises, after assigning the final compute node to the selected hostpool, receiving streaming data to be processed by the plurality of processing elements, wherein at least one of the plurality of processing elements processes at least a portion of the received streaming data on the final compute node.

13. The system of claim 12, wherein the processing element comprises a first processing element, wherein the operation further comprises performing a specified operation to establish the stream application, the specified operation to establish the stream application comprising:
selecting a current optimization mode from a plurality of optimization modes based on at least one of a number of optimization constraints, a type of each optimization constraint, and a number of the plurality of compute nodes;
selecting a second processing element from the plurality of processing elements in the stream application, based on at least one processing element selection criteria.

14. The system of claim 13, wherein the plurality of candidate compute nodes comprises a first plurality of candidate compute nodes, wherein the final compute node comprises a first final compute node, wherein the specified operation to establish the stream application further comprises:
determining, based on one or more optimization constraints and from among the plurality of compute nodes, a second plurality of candidate compute nodes to which the second processing element can be assigned;
selecting, based on at least one compute node selection criteria, a second final compute node from the candidate compute nodes, wherein each of the processing element selection criteria and the compute node selection criteria is determined by a current optimization mode for the stream application; and
assigning the second processing element to the second final compute node.

15. The system of claim 14, wherein the processing element is assigned to the compute node as part of a first assignment, wherein the specified operation to establish the stream application further comprises, in a first instance of attempting to perform an assignment other than the first assignment:
upon detecting a failure to assign at least one of the plurality of processing elements to at least one of the plurality of compute nodes:
changing the current optimization mode to a different optimization mode selected from a plurality of optimization modes; and
resetting any assignment of the plurality of processing elements in the stream application.

16. The system of claim 15, wherein the specified operation to establish the stream application further comprises, in a second instance of attempting to perform an assignment other than the first assignment:
upon detecting a failure to allocate at least one of the plurality of processing elements to at least one of the plurality of compute nodes:
adding a random criteria into at least one of the processing element selection criteria and the computer node selection criteria, the random criteria randomly determines (i) the compute node from the candidate compute nodes or (ii) to evaluate a different criteria; and
resetting any assignment of the plurality of processing elements in the stream application.

17. The system of claim 16, wherein the current optimization mode optimizes, in respective instances: (i) a solvability of the stream application; (ii) a performance of the stream application; (iii) a cost of executing the stream application; and (iv) a cluster configuration of the stream application; wherein the specified operation to establish the stream application further comprises:
allocating each of the plurality of processing elements in the stream application;
if the time spent allocating each of the plurality of processing elements exceeds a threshold time, changing the current optimization mode to a different optimization mode selected from the plurality of optimization modes; and
resetting any assignment of the plurality of processing elements in the stream application.

18. The system of claim 17, wherein in a given instance, before the processing element being selected from the plurality of processing elements, the current optimization mode is selected based on a set of at least one of pre-defined element selection criteria and compute node selection criteria.

19. The system of claim 18, wherein the operation comprises a first operation, wherein the compute node comprises a first compute node, wherein the operation further comprises performing a second operation for a second allocation, wherein performing the second operation comprises:
comparing the first compute node to a first constraint associated with the first level of the constraint tree, the first constraint determining whether the first compute node can be allocated to the processing element;
upon determining the first compute node does not satisfy the first constraint, determining whether the first compute node satisfies a second, different constraint associated with the second level of the constraint tree;
determining a total number of unsatisfied constraints associated with the first compute node regardless of whether the first compute node satisfies the first and second constraints;
determining for a second compute node a total number of unsatisfied constraints regardless of whether the second compute node satisfies the first and second constraints, wherein the second compute node is compared to the same constraints as that of the first compute node; and prioritizing for display an indication of the first compute node and an indication of second compute node based on the total numbers of unsatisfied constraints for the first compute node and second compute node, respectively, wherein the processing element is communicatively coupled to at least one other processing element located on a separate compute node in the operator graph.

20. The system of claim 19, wherein performing the second operation further comprises:

upon determining at least one of the first and second compute nodes does satisfy the second constraint, transmitting for display a user action that at least one of: (i) changes a condition, which causes the first or second compute node to satisfy the first constraint and (ii) instructs the first constraint to be ignored;

wherein after the user action is performed, the processing element is assigned to the at least one of first and second compute nodes, wherein the plurality of processing elements performs different tasks associated with the stream application;

wherein the user action does not change any source code of the stream application, wherein the user action comprises, in respective additional instances of performing the second operation: (i) ignoring the first constraint; (ii) satisfying the first constraint by modifying a characteristic of the first compute node; (iii) modifying a job associated with the first compute node; and (iv) restarting the first compute node.

* * * * *